United States Patent
Rubio

[15] 3,655,385
[45] Apr. 11, 1972

[54] TORTILLA AND PROCESS USING EDIBLE HYDROPHILIC GUM

[72] Inventor: Manuel Jesus Rubio, Bridgeport, Conn.

[73] Assignee: Roberto Gonzalez Barrera, Monterrey, Mexico

[22] Filed: June 8, 1970

[21] Appl. No.: 44,585

[52] U.S. Cl. ............................................................99/80 R
[51] Int. Cl. ..................................................A21d 2/18
[58] Field of Search...............................99/80, 86, 91, 92, 93

[56] References Cited

UNITED STATES PATENTS

| 2,002,053 | 5/1935 | Doolin | 99/80 |
| 2,509,927 | 5/1950 | Johnston | 99/91 |
| 2,584,893 | 2/1952 | Lloyd et al. | 99/93 |
| 3,369,908 | 2/1968 | Gonzalez et al. | 99/93 |

*Primary Examiner*—Raymond N. Jones
*Attorney*—Jackson, Jackson and Chovanes

[57] ABSTRACT

To retard the staling of tortillas, which are an unleavened unshortened food product made from nixtamalized corn or corn flour and to increase the yield of dough and tortillas by incorporating an additive in making the tortilla dough. The additive is edible hydrophilic gum.

12 Claims, No Drawings

TORTILLA AND PROCESS USING EDIBLE HYDROPHILIC GUM

The present invention relates to retarding the staling of tortillas and increasing the yield of tortilla dough and tortillas.

Many expedients which apply for preventing staling to the usual wheat, whole wheat or rye bread, commonly eaten, are not effective when applied to tortillas because of the marked differences in their composition from the breads mentioned above. Among these differences are:

1. Tortillas are made from whole corn, that is, corn which contains its germ, hull, bran, etc. Bread is made from dehulled, degermed and debranned wheat.
2. Dehulled, degermed, debranned wheat used in making bread undergoes no chemical treatment before grinding. Whole corn used in making tortillas always undergoes the chemical treatment of steeping in limewater at pH 12 before grinding.
3. Dehulled, degermed, debranned wheat used in making bread is ground into a flour in the dry state. Steeped whole corn used in making tortillas is ground into a dough in the wet state, after which the dough is either dried into a flour or used directly to make tortillas.
4. The dough used for making bread is always prepared from dry dehulled, degermed, debranned wheat flour. The dough used for making tortillas may be prepared either from dry limed whole corn flour or directly by grinding whole corn steeped in limewater at pH 12.
5. In addition to dehulled, degermed, debranned wheat flour, the dough used for making bread always contains some of the following ingredients: shortening, a leavening agent (yeast, air, or baking powder), salt, sugar, milk solids or milk, eggs or egg solids, and water. Dough used in making tortillas only contains ground limed whole corn and water.
6. The final moisture content of bread after baking is approximately 20 percent; that of tortillas after cooking is approximately 45 percent. Due to its lower moisture content, bread is much less subject to microbial spoilage than tortillas.
7. Bread is baked inside an oven by hot air at a temperature of 425°–500° F. for 30–60 minutes. Tortillas are cooked on a hot plate at 290°–410° F., each side or face being exposed alternately to the heat for 15–20 seconds, after which the first side is again exposed for an additional 15–20 seconds.
8. Other differences between bread and tortillas are the following:
   a. Dehulled, degermed, debranned wheat flour used in breadmaking is usually bleached; limed corn flour used for making tortillas is never bleached.
   b. Bread is usually leavened; tortillas are never leavened.
   c. Bread is always baked in the shape of loaves or rolls; tortillas are always shaped in the form of round, flat discs.
   d. The structure of bread is largely due to the presence of proteins known as "glutelin" and "gliadin" which are components of dehulled, degermed, debranned wheat. Corn contains no such protein, so that the structure of tortillas is due mostly to their starch component.

The base material for making tortillas is limed corn dough, whose preparation is described below.

Flat discs of dough of diameter 4–6 inches and height 2–3 millimeters are prepared either by hand, by use of any mechanical equipment which squashes or presses pieces of dough, or by any suitable automatic machine.

After they have been made, the flat discs of dough are cooked on a hot plate whose temperature varies from 290°–410° F. In the cooking process, each face or side of the disc is alternately exposed to the heat for 15–20 seconds, after which the first side is again exposed for an additional 15–20 seconds.

The cooked discs or tortillas have a moisture content of 40–48 percent and are ready to eat.

Limed corn dough may be prepared from limed corn flour of size smaller than 45 U.S. Standard Mesh, 8–12 percent moisture content and pH 6–7. The dough is made by mixing 1.0–1.4 pounds of tap water per pound of flour.

Limed corn dough may also be made directly by grinding corn which has been steeped in limewater. In such case 1 pound of corn is steeped overnight in 0.5–0.8 pounds of water, initially at boiling temperature, which contains 0.5–1.5 percent calcium hydroxide. It should be noted that when the corn is added to the limewater, the latter is either at or close to its boiling temperature. However, after both ingredients have been mixed, no further heat is applied so that the temperature of the mixture drops gradually during the steeping process.

It might be mentioned that tortillas, when normally prepared as described herein and without additives of any kind, have a maximum shelf life of 12–15 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after 24 hours, marked after 48 hours and almost complete after 72 hours if the product is kept at room temperature. It should be noted that the hardening or staling effect increases with decreasing temperature until the freezing point of water in the product is reached. At temperatures below room temperature but above the freezing point of water in the tortillas, therefore, hardening proceeds at a faster rate than at room temperature and vice-versa.

In determining the flexibility index a tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

Table 1 gives typical values for variation of the flexibility index of tortillas with time at room temperature.

TABLE 1

Variation of the Flexibility Index of Tortillas with Time at Room Temperature

| Flexibility index after the following elapsed time | | | | |
|---|---|---|---|---|
| 0 hr. | 24 hr. | 48 hr. | 72 hr. | 96 hr. |
| 8.5 | 7.7 | 6.5 | 6.0 | 5.5 |

Hardening or loss of flexibility of tortillas is believed to be due to a physico-chemical change in the starch constituent of tortillas which is known as retrogradation. This phenomenon has been studied in substances other than tortillas and is described in the technical literature (Whistler 1965).

The additive of the present invention imparts the property of retarding the loss of flexibility of tortillas with time. It must be mixed with the dough used for making tortillas, although as later explained, the mixture may be achieved in various ways.

Thus, in respect to this aspect of the invention, tortillas stored under conditions in which no moisture is lost from them become stale more slowly because of the additive of the invention, which retards hardening with time, retards loss of flexibility with time, increases the freshness of the tortillas, prolongs the flexible shelf life of the tortillas and increases the freshness of both freshly made tortillas and also reheated tortillas.

YIELD

It has been known that the yields of tortillas depend upon the ability of the dough or of the tortillas to retain water. The additive of the invention increases the water-binding ability of the dough and of the tortilla.

When tortilla dough is prepared from limed corn or limed corn flour, it has a certain consistency. When an additive of the invention is mixed with the dough, unless more water is added, the dough becomes stiffer and in order to obtain the consistency of tortilla dough without the additive, it is necessary to add more water to the dough. Thus, the yield of dough obtained per unit weight of limed corn or limed corn flour is increased. In the case of tortilla dough and tortillas the yield is the number of kilos of dough per kilo of corn, or the number of kilos of tortillas per kilo of corn, or the number of kilos of dough per kilo of limed corn flour or the number of kilos of tortillas per kilo of limed corn flour.

Similarly, when tortillas are prepared from ordinary limed corn dough, a certain amount of water is lost when they are cooked. If, however, tortillas are prepared from limed corn dough which contains the additive of the invention, an amount of water which is less than that from ordinary dough will be lost from the tortillas when they are cooked. The result is that the yield of tortillas obtained per unit weight of limed corn or limed corn flour will be increased.

Thus, in this aspect of the invention, the additive increases the yield of dough made from limed corn or limed corn flour and increases the yield of tortillas made from limed corn or limed corn flour.

GUM ADDITION

Hydrophilic edible gums and colloids in concentrations of 0.25 to 5 percent, preferably 0.25 to 2 percent, on the weight of the tortillas are effective in rendering tortillas more flexible after storage for prolonged times without loss of moisture and also increasing the yield of tortillas. These substances have the ability to retain a large amount of water per unit dry weight of the substances.

Suitable hydrophilic edible gums or colloids for use in the present invention are seaweed derivatives such as furcellaran, seed derivatives such as locust bean gum, tree exudates such as gum arabic and gum tragacanth and synthetic gums such as hydroxypropyl methylcellulose and sodium carboxymethyl cellulose. A mixture of the above gums is also suitable.

The gums normally available as powders which can be finely ground like flour if desired. Table 2 shows the effects of different additions of locust bean gum in tortillas on flexibility after storage without loss of moisture at room temperature. The gums of the character under discussion are among the most effective materials in preventing staling as measured by loss in flexibility.

Table 2.—Typical flexibility values at room temperature obtained by addition of locust bean gum to tortillas

| Dose of gum based on weight of tortillas, percent | Flexibility index after— | | | | |
|---|---|---|---|---|---|
|  | 0 hr. | 24 hr. | 48 hr. | 72 hr. | 96 hr. |
| 0.0 (Control) | 7.7 | 6.5 | 6.0 | 5.5 | 5.0 |
| 0.5 | 9.0 | 8.3 | 7.7 | 6.3 | 6.0 |
| 1.5 | 9.3 | 8.5 | 8.0 | 7.3 | 6.8 |
| 2.0 | 9.5 | 9.3 | 8.7 | 8.0 | 7.8 |

Table 3 shows the great effectiveness of gums of the present invention in increasing the yield of tortilla dough and of tortillas.

TABLE 3

Typical Yield Values Obtained by Addition of Locust Bean Gum to Dough and Tortillas

| Dose of gum based on weight of tortillas | Yield of dough, kilos per kilo of flour | Yield of tortillas, kilos per kilo of flour |
|---|---|---|
| 0.0% (Control) | 2.190 | 1.852 |
| 0.5% | 2.246 | 1.928 |
| 1.0% | 2.289 | 1.936 |
| 2.0% | 2.422 | 2.018 |

METHODS OF INCORPORATION OF GUM

The hydrophilic edible gum or colloid may be added to the dough in one of several ways. Dry powdered gum may be mixed with the completed dough and thoroughly homogenized.

Another way of incorporating hydrophilic edible gum in the dough when starting with dry limed corn flour is to mix the powdered gum with the flour and afterwards incorporate these dry ingredients into the water.

A further method of adding hydrophilic edible gum to the dough is first to dissolve the gum in water and use this water with other water for incorporation with the dry limed corn flour. Although the gum solutions are thick and viscous, they can readily be homogenized in the dough.

EXAMPLE 1

Nixtamalized corn flour is mixed into tortilla dough in a dough mixer with about 140 percent of water on the dry weight. Two percent on the weight of the tortilla of the dry ingredient locust bean gum in powdered form is added to the dough and incorporated therein by the dough mixer.

Table 2 shows the advantages in retaining flexibility during storage without loss of moisture, and Table 3 shows the advantages in greater yield of dough and tortillas.

EXAMPLE 2

Locust bean gum is dissolved in water by heating. Dough is made in the dough mixer by mixing nixtamalized corn flour with approximately 130 percent of water including sufficient of the locust bean gum solution when cold to incorporate 1 percent on the weight of the tortilla of the locust bean gum in the dough.

The properties obtained and the advantages are shown in Tables 2 and 3.

EXAMPLE 3

Nixtamalized corn flour and 2 percent on the weight of the tortillas to be produced of locust bean gum powder are incorporated into approximately 140 percent of the dry ingredients of water in a dough mixer. The properties obtained after baking the tortillas are set forth in Tables 2 and 3.

EXAMPLE 4

The procedure of Example 1 is carried out using furcellaran instead of locust bean gum.

The resulting properties are substantially the same.

EXAMPLE 5

The procedure of Example 1 is carried out using sodium carboxymethyl cellulose instead of locust bean gum. The properties are substantially the same.

In view of my invention and disclosure, variations and modifications to meet individual whim or particular need will doubtless become evident to others skilled in the art, to obtain all or part of the benefits of my invention without copying the process and composition shown, and I therefore claim all such insofar as they fall within the reasonable spirit and scope of my claims.

Having thus described my invention, what I claim as new and desire to secure by Letters Patent is:

1. A tortilla essentially consisting of nixtamalized corn or nixtamalized corn flour and between 0.25 and 2 percent on the weight of hydrophilic edible gum.

2. A tortilla of claim 1, in which the gum is locust bean gum.

3. A tortilla of claim 1, in which the gum is furcellaran.

4. A tortilla of claim 1, in which the gum is carboxymethyl cellulose.

5. Tortilla dough essentially consisting of nixtamalized corn or nixtamalized corn flour and between 0.25 and 2 percent on the weight of the tortilla of hydrophilic edible gum.

6. Tortilla dough of claim 5, in which the gum is locust bean gum.

7. A tortilla of claim 5, in which the gum is furcellaran.

8. A tortilla of claim 5, in which the gum is carboxymethyl cellulose.

9. A process of producing tortilla dough which will make tortillas of improved flexibility after storage without loss of moisture and with improved yields, which comprises mixing nixtamalized corn or nixtamalized corn flour with water to make dough and incorporating the dough from 0.25 to 2 percent on the weight of the tortillas of hydrophilic edible gum.

10. A process of claim 9, in which the gum is locust bean gum.

11. A process of claim 9, in which the gum is furcellaran.

12. A process of claim 9, in which the gum is carboxymethyl cellulose.

* * * * *